United States Patent [19]
Hoblingre et al.

[11] Patent Number: 5,105,677
[45] Date of Patent: Apr. 21, 1992

[54] ADJUSTABLE STEERING COLUMN

[75] Inventors: André Hoblingre, Valentigney; Frédéric Mouhot, Voujeaucourt; Jean-Pierre Barnabe, Valentigney, all of France

[73] Assignee: ECIA, France

[21] Appl. No.: 661,146

[22] Filed: Feb. 27, 1991

[30] Foreign Application Priority Data

Feb. 28, 1990 [FR] France ................... 90 02528

[51] Int. Cl.$^5$ .................... B62D 1/18; F16H 27/02
[52] U.S. Cl. ................... 74/493; 74/89.17; 280/775
[58] Field of Search ........... 74/89.17, 493; 280/775

[56] References Cited

U.S. PATENT DOCUMENTS

| | | | |
|---|---|---|---|
| 4,078,448 | 3/1978 | Naka | 74/493 |
| 4,541,298 | 9/1985 | Strutt | 74/493 |
| 4,691,587 | 9/1987 | Farrand et al. | 74/493 |
| 4,752,085 | 6/1988 | Yamamoto | 280/775 |

FOREIGN PATENT DOCUMENTS

| | | |
|---|---|---|
| 0315823 | 5/1989 | European Pat. Off. . |
| 3631946 | 4/1987 | Fed. Rep. of Germany ........ 74/493 |
| 0195173 | 8/1989 | Japan ..................... 74/493 |
| WO88/10205 | 12/1988 | PCT Int'l Appl. . |

*Primary Examiner*—Allan D. Herrmann
*Assistant Examiner*—David W. Laub
*Attorney, Agent, or Firm*—Sughrue, Mion, Zinn, Macpeak & Seas

[57] ABSTRACT

A telescopic steering-wheel shaft (1) is rotatably mounted in a column body (4–6) capable of pivoting about a horizontal axis (17). The column body (6) is supported at one end by a slide (48) for suspension on a rack (26) driven by a pinion (24) carried by the output shaft of a geared motor (20). A pressure screw (52) acting on the column body and on the slide ensures that play is taken up. The column body (6) is connected at its opposite end to a rack driven by a pinion (80) carried by the output shaft of a second geared motor (84).

12 Claims, 4 Drawing Sheets

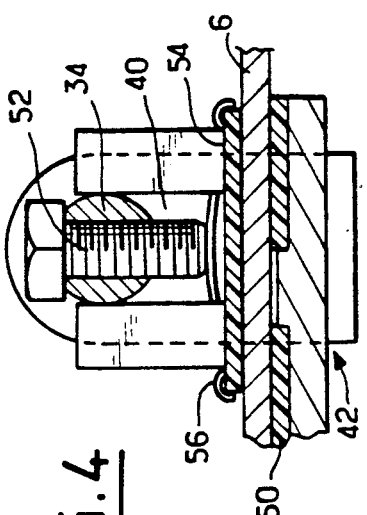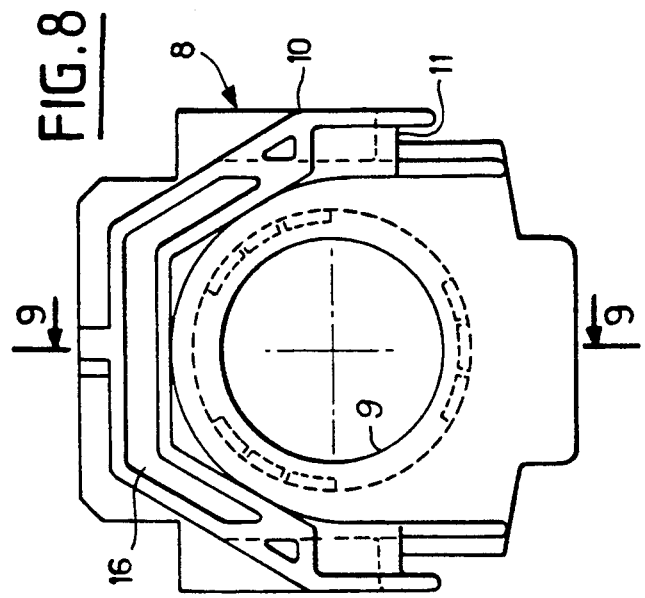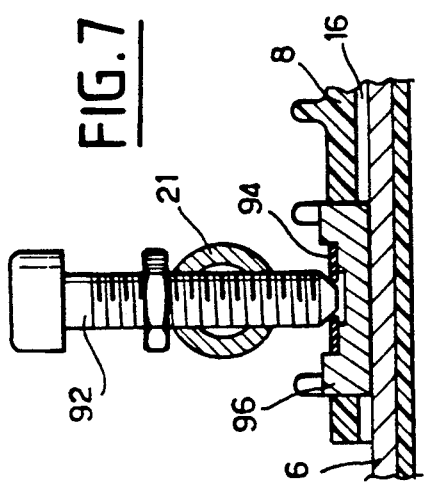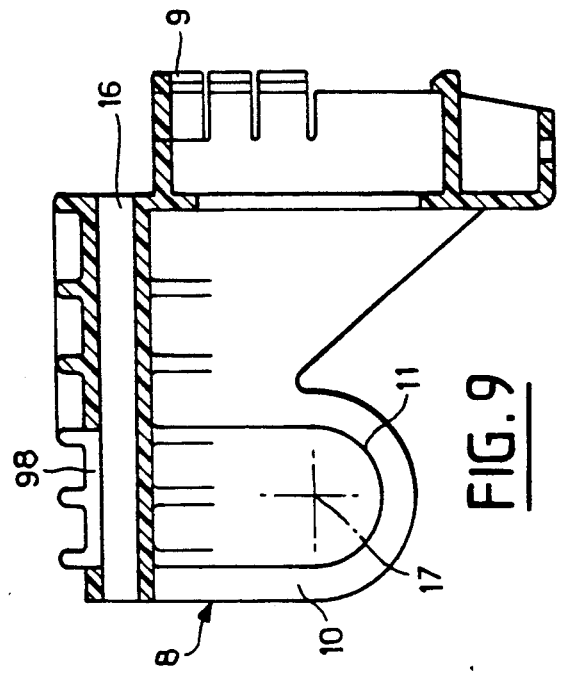

ADJUSTABLE STEERING COLUMN

BACKGROUND OF THE INVENTION

The improvement of the driving comfort of motor vehicles is of constant concern to manufacturers and is an incentive for them to provide vehicles with an adjustable steering column allowing the position of the steering wheel to be adapted to the morphology of the driver.

This adaptation can be effected in the vertical plane and/or along the axis of the steering column. In the first case, the steering shaft carrying the steering wheel is rotatably mounted in a column body which is capable of pivoting about a horizontal axis. In the second case, the steering shaft is constructed in two parts mounted telescopically relative to one another Adjustment devices control the displacements and hold the column in the desired position.

At present, these adjustment devices are generally controlled manually, allowing them to be of robust and reliable construction. Indeed, although users are desirous of having at their disposal servo adjustment controls and, in particular, electrically powered adjustment controls, the construction of such controls has proven difficult by reason, in particular, of the forces to which the steering column of the vehicle is subjected.

SUMMARY OF THE INVENTION

It is the object of the present invention to meet this requirement by providing an adjustable steering column which is both controlled by motors and is also robust and reliable.

Indeed, the subject of this invention is an adjustable steering column comprising a steering-wheel shaft rotatably mounted in a column body capable of pivoting about a horizontal axis between two vertical lateral flanges, and means for adjusting the position of the column, in which the means of adjustment comprise at least one rack which is in mesh with the output pinion of a motor for controlling the pivoting of the column and carrying at its end a member for suspending the column body, which member is rigid and is guided by inclined ramps of the flanges.

By virtue of this arrangement, the longitudinal displacement of the rack is transformed into a vertical displacement of the column body and consequently of the steering wheel. Moreover, the rigid member for suspending the column body minimises the forces transmitted to the output pinion of the geared motor.

According to a preferred embodiment, the suspension member comprises a slide which is movable along the column body and at least one arm for suspension on the rack.

The steering-wheel shaft can moreover be in two parts, one of which is supported by a pivoting bearing while the other is integral with the column body. This column body is then mounted so as to slide relative to the pivoting bearing and is connected to the end of a rack in mesh with the output pinion of a motor for controlling the axial displacement of the steering wheel.

Means of taking up the sliding play and rotary play are provided at right angles to each of the racks.

The description below of an embodiment given by way of non-limitative example and represented in the attached drawings will moreover bring out the advantages and characteristics of the invention. In these drawings:

BRIEF DESCRIPTION OF THE DRAWINGS

FIG. 4 shows the device for taking up play, in section along the line 4/4 in FIG. 3 and on an enlarged scale.

FIG. 7 is a view in section, on a larger scale, of the play-elimination system of the steering column shown in FIG. 2.

FIG. 8 is an end view of the pivoting bearing block for supporting the column.

FIG. 9 is a view in section along the line 9/9 in FIG. 8.

DESCRIPTION OF THE PREFERRED EMBODIMENTS

Figure 1:
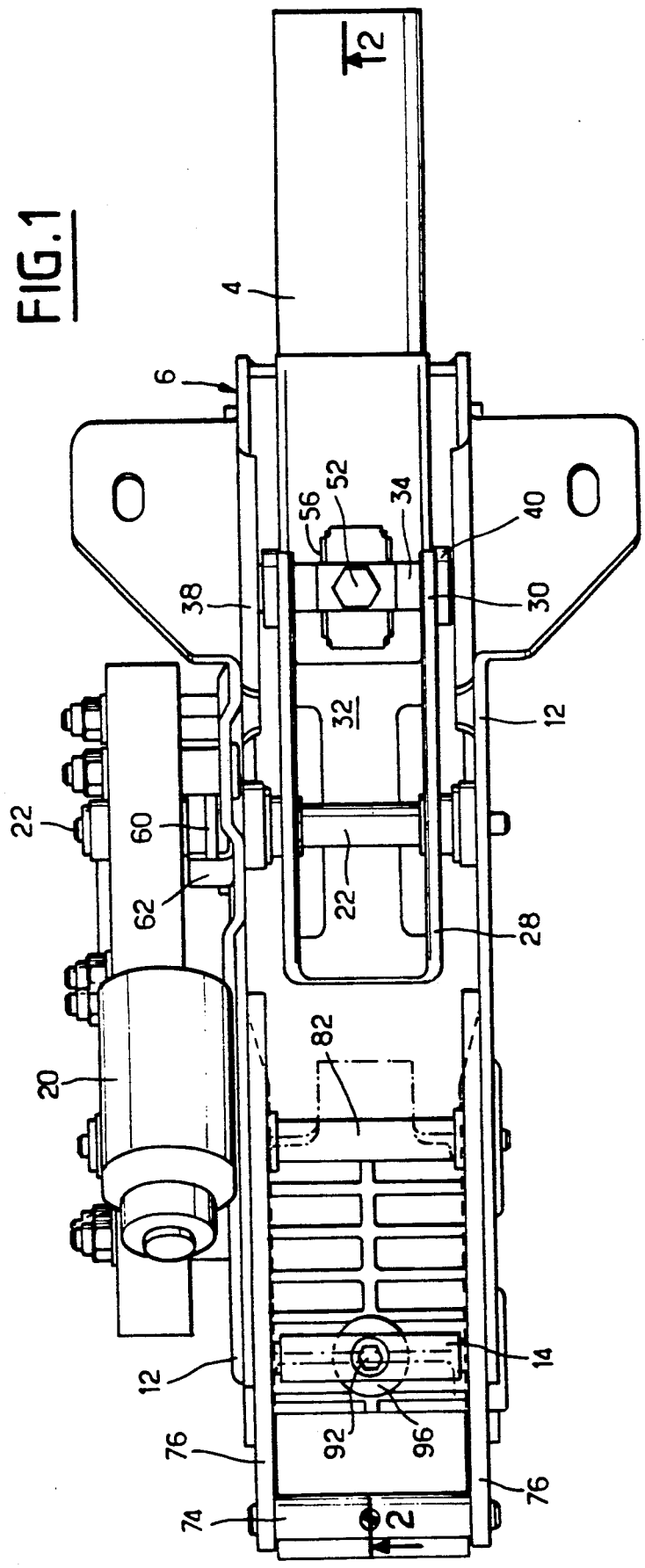
FIG. 1 is a plan view of an adjustable steering column according to the invention.

The motor-vehicle steering column represented in the drawings (see FIGS. 1 and 2) comprises a steering-wheel shaft 1 which is equipped at its upper part with means for fixing a steering wheel (not shown) and, at its lower part, forms a Cardan fork 2 allowing it to be attached to a lower steering shaft or directly to the transmission members. The steering shaft 1 is rotatably mounted in proximity to the means for fixing to the steering wheel, in a casing tube 4 which extends the upper part of a column body 6 having substantially the cross-section of an inverted V flattened at its tip.

In the vicinity of the Cardan fork 2, the steering-wheel shaft 1 turns in a bearing block 8 comprising (FIGS. 8 and 9) a bearing 9 extended longitudinally by lugs 10 which are joined together at their upper part and, at their lower part, form semi-cylindrical bearing surfaces 11. These bearing surfaces 11 rest on correspondingly shaped bearing surfaces of two lateral supporting flanges 12 (FIG. 1) which are vertical and parallel to one another and are joined to one another by a certain number of spacers 14.

The pivoting bearing block 8 is pierced above the lugs 10 by a longitudinal passage 16 having a cross-section substantially in the shape of an inverted and flattened V into which the column body 6 is introduced and supported. The assembly comprising the column body 6 and the steering-wheel shaft 1 can thus pivot about the horizontal axis 17 passing through the centres of the semi-cylindrical bearing surfaces 11, taking along the steering wheel.

Figure 2:
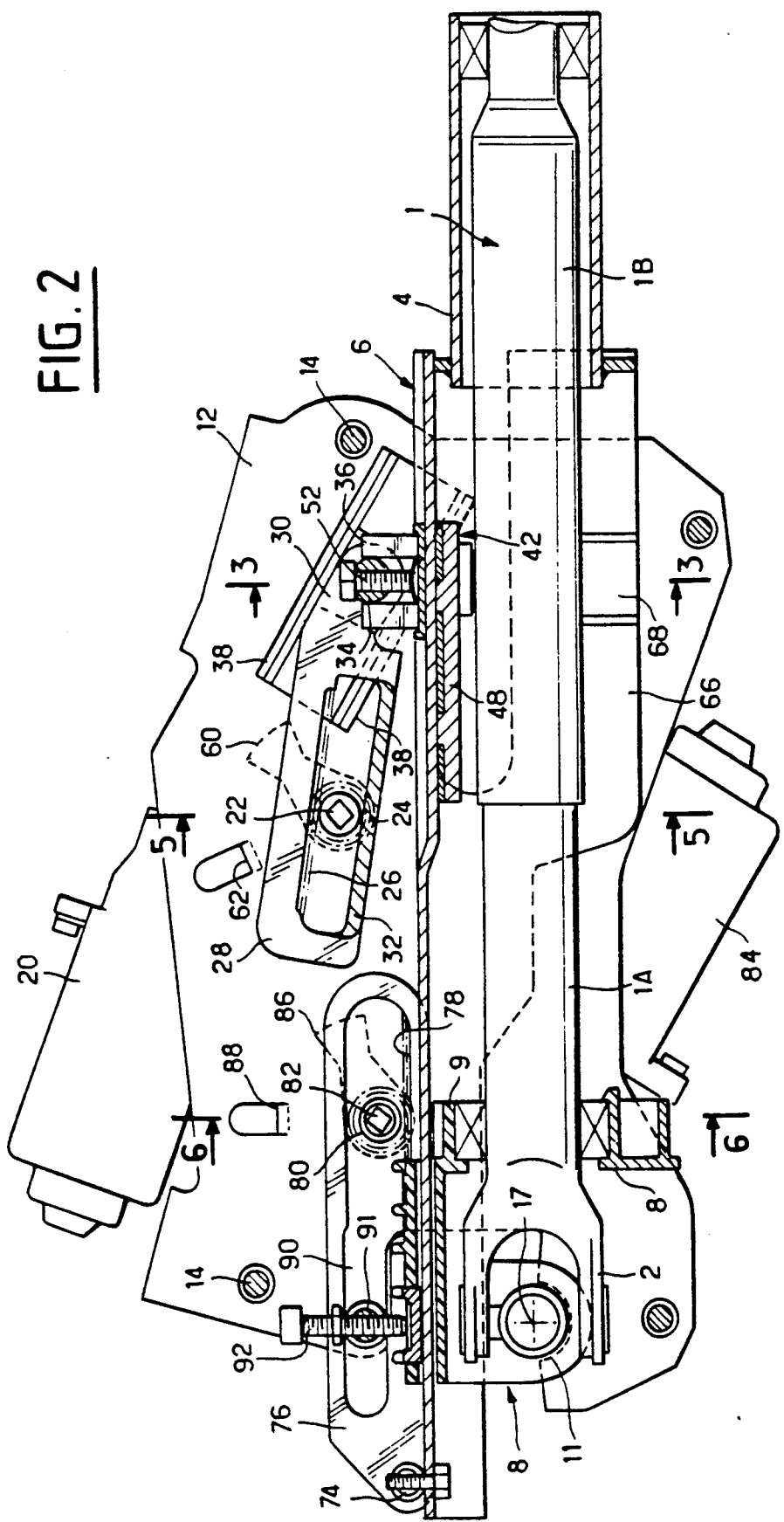
FIG. 2 is a view in vertical section along the line 2/2 in FIG. 1.
Figure 3:
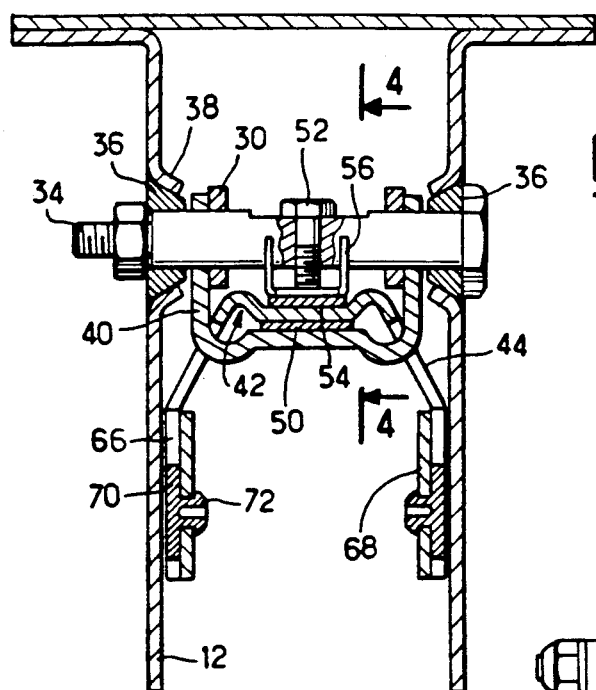
FIG. 3 is a view in section along the line 3/3 in FIG. 2, the steering-wheel shaft not being shown.
Figure 6:
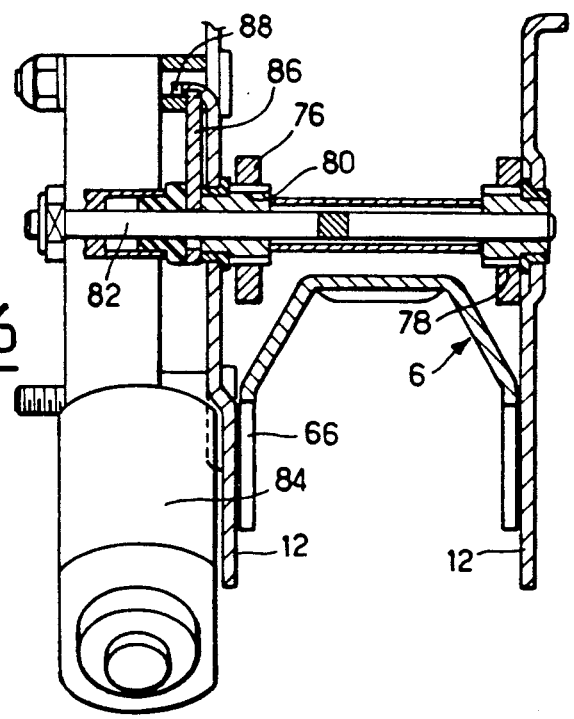
FIG. 6 is a view in section along the line 6/6 in FIG. 2, without the steering-wheel shaft and the pivoting bearing.
Figure 5:
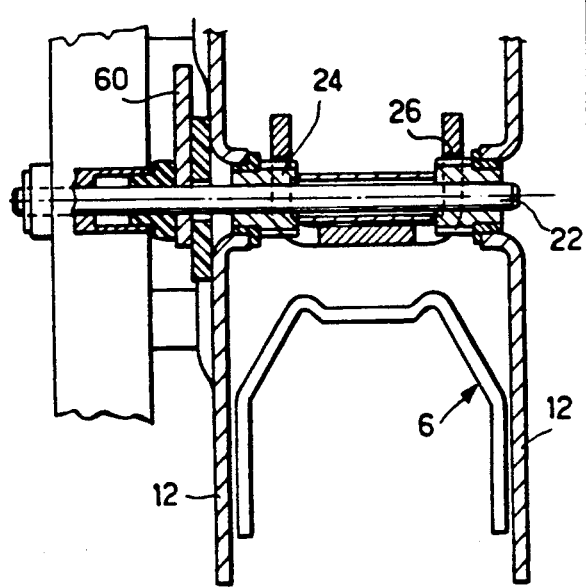
FIG. 5 is a view in section along the line 5/5 in FIG. 2, the steering-wheel shaft not being shown.

A geared motor 20, which preferably comprises an electric motor, is mounted on the outside of the assembly formed by the two lateral flanges 12, on one of the latter, to control and adjust this displacement of the steering wheel. The output shaft 22 of this motor carries at least one pinion 24 and preferably two pinions, as in the embodiment shown (FIG. 2 and 5). Each of pinions 24 is in mesh with a rack 26 formed on the lower part of an arm 28 ending in an eye-joint link 30. The two arms 28 are preferably connected to one another by a lower plate 32 while the two eye-joint links 30 are passed through by the same pin 34, which extends beyond these eye-joint links and carries two shoes 36 movable along inclined ramps 38 cut into the lateral flanges 12 (FIG. 3). Since the ramps 38 are formed by the inward-bent edges of the cut-out of the corresponding flange, each of the shoes 36 initially has the shape of a portion of a cylinder, the lateral wall of which is deformed on contact with the edges of the ramp.

The pin 34 likewise passes through the two lateral branches 40 of a rigid suspension member 42 of the column body 6. This member 42 has a substantially U-shaped section. These lateral branches 40 pass through longitudinal apertures 44 of the column body 6 and its base is extended by a plate 48 (see FIGS. 2, 3 and 4) which is in sliding contact, preferably with the interposition of friction sheet 50, with the internal face of this body 6.

A pressure screw 52 preferably passes through the pin 34 and acts via a bearing shoe 54 on the column body 6 and on the sliding suspension member 42, 48 in order to take up play. A spring or a resilient plate 56 can likewise be mounted between the screw 52 and the bearing shoe 54 to compensate any wear.

During a vertical adjustment of the position of the steering wheel, the geared motor 20, in rotating the shaft 22 and the pinion 24 causes a displacement of the rack 26 and consequently of the pin 34. The shoes 36 slide in the ramps 38, taking along the suspension slide 42. The plate 48 slides along the internal surface of the column body 6 but the branches 40, which are rigid and have a constant length make this column body and the bearing block 8 pivot at the same time as the steering-wheel shaft 1 on the bearing surfaces of the lateral flanges. A displacement of the pin 34 and the shoes 36 on the ramps 38 towards the right in FIG. 2, for example, pushes the column body 6 downwards and consequently lowers the steering wheel.

Preferably, a finger 60 is mounted on the shaft 22 in such a way as to be integral with the latter in rotation, and one of the lateral flanges 12 has a stop 62, cut into its wall, which limits the displacement of the finger 60 and determines the travel of the pinion 24 on the rack 26. Any risk of damage to the ends of the rack by the pinion 24 is thus avoided. Moreover, the suspension slide 42, 48 ensures a transfer of the radial forces on the column body 6, 4 to the lateral flanges 12 and minimises the forces borne by the pinions 24.

To facilitate the displacement of the column body 6 between lateral flanges 12, the overall transverse space requirement of this column body is slightly less than the distance which separates the two lateral flanges 12. Moreover, each of the vertical flanks 66 of this column body 6 has a part 68 pushed back inwards which delimits a compartment for a resilient friction shoe under tension 70 provided in its centre with a stud 72 for clamping onto the flank 68. Preferably, the external surface of each of the friction shoes 70 initially has a spherical shape which facilitates sliding without play.

Of course, the steering column according to the invention can likewise be provided with means for adjusting the axial position of the steering wheel. In this case, as shown in FIG. 2, the steering-wheel shaft 1 comprises two parts 1A and 1B mounted telescopically relative to one another. The lower part 1A forms the Cardan fork 2 and is mounted pivotally in the bearing block 8. The upper part 1B carries the steering wheel and is rotatably mounted in the casing tube 4 of the column body 6. The latter slides in the passage 16 of the bearing block 8, extends outside this bearing block and, at its end, carries a pin 74 which is mounted so as to oscillate in at least one rack support 76 and preferably in two supports 76 mounted at each of its ends (FIG. 1).

The rack 78 carried by each of the supports 76 is in mesh with a pinion 80 which is integral with the output shaft 82 of a geared motor 84. The geared motor 84 preferably comprises an electric motor and it is mounted on the same lateral flange 12 as the geared motor 20 but in the opposite direction. The shaft 82 likewise carries a finger 86 mounted on it in such way as to be integral with it in rotation. In the same way as finger 60, finger 86 thus pivots between two extreme positions in which it is in contact with one of the two opposite faces of a stop 88 cut into the wall of the lateral flange 12.

The support 76 of each of the racks 78 delimits an internal slot 90 through which there passes a pivoting spacer 91 connecting the two lateral flanges 12. In its median part, this spacer 14 is passed through vertically by a pressure screw 92 (FIG. 7) which presses via a spring 94 on a bearing shoe 96 which passes through an orifice 98 of the upper part of the bearing block 8, projects into the passage 16 and enters into contact with the body of the column 6, which it tends to push towards the bottom of the passage 16, thus ensuring that play is taken up.

When the geared motor 84 is put into action, the rotation of the output shaft 82 brings about a pivoting of the finger 86 and a rotation of the pinion 80 which causes a translational displacement of the rack 78 and of its support 76. The pin 74 is thus displaced, for example to the left when considering FIG. 2, and takes along the column body 6, which is integral in translation with the upper part 1B of the steering-wheel shaft. The steering wheel comes progressively closer to the Cardan fork 2 while the column body 6 slides on the slide 48, the position of which remains unchanged. This displacement can continue until the moment when the finger 86 comes into contact with the left-hand face of the stop 88, but it can be stopped in any intermediate position by cutting the supply to the motor 84 at the moment when the steering wheel reaches the desired position Of course, a rotation of the output shaft 82 of the motor 84 and consequently of the pinion 80 on the rack in the opposite direction causes rightward sliding of the column body 6 and of the upper part 1B of the steering-wheel shaft, which comes closer to the driver, while at the same time causing the finger 86 to pivot in the direction of the opposite face of the stop 88.

In the course of the axial adjustment, the means for vertical adjustment do not undergo any change and the finger 60 remains in the same position, for example resting against the stop 62. The forces due to the sliding of the column body in the slide 48 are absorbed by the bearing shoes 50, 54, and the pressure screws in this way protect the rack and the pinion.

On the other hand, when the geared motor 20 is excited, the rotation of the pinion 24 takes along the rack 26 and makes the pin 34 and the slide 42, 48 slide progressively between the ramps 38. The upper part of the column body 6 is displaced in the vertical plane, simultaneously causing the pivoting of the steering-wheel shaft 1 and of the bearing block 8 about the axis 17 in the bearings of the lateral flanges 12, and furthermore makes the pin 74 and the rack supports 76 pivot. Since these supports are resting on the pinions 80 both by the toothing of the rack 78 and by the facing upper edge of the slot 90 and since they are passed through by the pivoting spacer 91, they pivot slightly. Their pivoting angle is slight but large enough to permit the adjustment of the position of the steering wheel. The pressure screw 92 furthermore takes up the play between the column body 6 and the bearing block 8.

According to an alternative embodiment, the vertical and axial adjustments of the steering wheel are controlled simultaneously by the geared motor 20. In this case, the column body 6 having a telescopic steering-wheel shaft 1A, 1B is fixed on the suspension member 42 and slides in the bearing block 8 while being pressed into the bottom of the passage 16 by the pressure screw 92. The displacement of the rack 26 makes the column body 6 pivot about the axis 17 but, at the same time, displaces it longitudinally in the passage 16 in such a way that the steering wheel travels through a trajectory which combines these two movements.

In this way, a steering column is obtained which permits easy adaptation of the position of a steering wheel to the morphology of the driver and provides all the guarantees of reliability demanded of a steering column.

What is claimed is:

1. Adjustable steering column assembly for a steering wheel of a vehicle, comprising a steering-wheel shaft (1) rotatably mounted in a longitudinally extending column body (4, 6) capable of changing vertical position by pivoting about a horizontal axis between two vertical lateral flanges 12 fixed to diametrically opposite sides of said column, and adjustment means for adjusting the vertical position of the column, comprises at least one rack (26) in mesh with an output pinion (24) of a motor (20) for controlling the pivoting of the column and carrying at a end thereof a rigid member (40) which suspends the column body (6) on the rack, said lateral flanges (12) containing inclined ramps (38) in which said rigid member is slidably guided.

2. Steering column assembly according to claim 1, wherein said rigid member (42) for suspending the column body (6) comprises a slide plate (48), which is movable along one end of said column body (6), and at least one arm (40) for suspending said body on the rack.

3. Steering column assembly according to claim 1 or 2, wherein the rack (26) is connected by a single pin (34) both to two shoes (36) sliding along said ramps (38) of the lateral flanges (12) and also to the rigid member (42) for suspending the column body.

4. Steering column assembly according to claim 2, wherein the rigid member (42) comprises two arms (40), each passing through a longitudinal aperture (44) of the column body (6), said slide plate (48) being in sliding contact with an internal face of said one end of the column body.

5. Steering column assembly according to claim 4, further comprising a bearing block (8) which is mounted so as to pivot about said horizontal axis between the lateral flanges (12), in which said shaft (1) rotates, and which has a longitudinally extending passage (16) receiving an opposite end of said column body (6).

6. Steering column assembly according to claim 3, further comprising a pressure-adjusting screw (52) for exerting pressure and taking up play between said rigid member (42) and said column body (16), said screw passing through the pin (34) of the rack (26) and acting on the rigid member (42) and on the column body (6).

7. Steering column assembly according to claim 6, further comprising a resilient plate (56) for compensating wear, said resilient plate being mounted between the pressure-adjusting screw (52) and the column body (6).

8. Steering column assembly according to claim 5, wherein the steering-wheel shaft (1) comprises two parts (1A and 1B) mounted axially telescopically reactive to one another, said opposite end of the column body being connected to at least one second rack (78) in mesh with an output pinion (82) of a geared motor (84) for adjusting the axial position of a steering wheel mounted on said shaft (10 at side one end of said column body (6), said opposite end of the column body being slidable through said passage (16) in said bearing block (8).

9. Steering column assembly according to claim 8, further comprising a rack support (76) for supporting said second rack (78), a pivoting spacer (91) mounted between the two lateral flanges (12), and a pressure screw means (92) passing through said spacer (91) and acting on the column body(6).

10. Steering column assembly according to claim 9, further comprising a bearing shoe which is accommodated in an orifice (98) of the bearing block (8) and which is in contact with the column body (6), said pressure screw means (92) clamping said bearing shoe (96).

11. Steering column assembly according to claim 4, wherein, at right angles t the adjustment means, the column body (6) has the cross-section of a V inverted and flattened at its tips.

12. Steering column assembly according to claim 1, further comprising means (60, 62-86, 88) for limiting displacements of the vertical and axial adjustments.

* * * * *